S. E. BRUNER & H. F. HARDIN.
FOUR-WHEEL DRIVE.
APPLICATION FILED APR. 15, 1912.
1,077,794.
Patented Nov. 4, 1913.
2 SHEETS—SHEET 2.
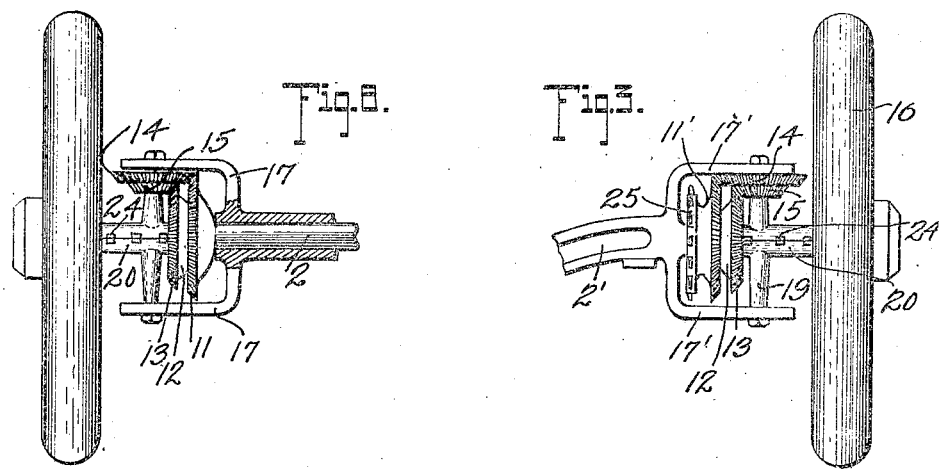
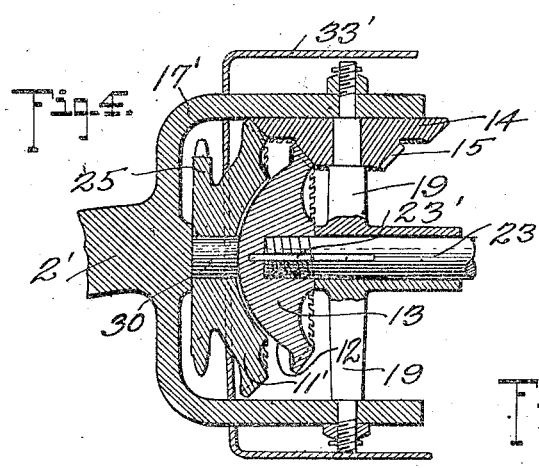
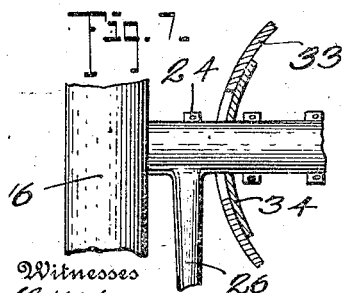
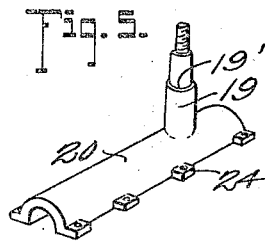
Inventors
Harley F. Hardin
Seabury E. Bruner

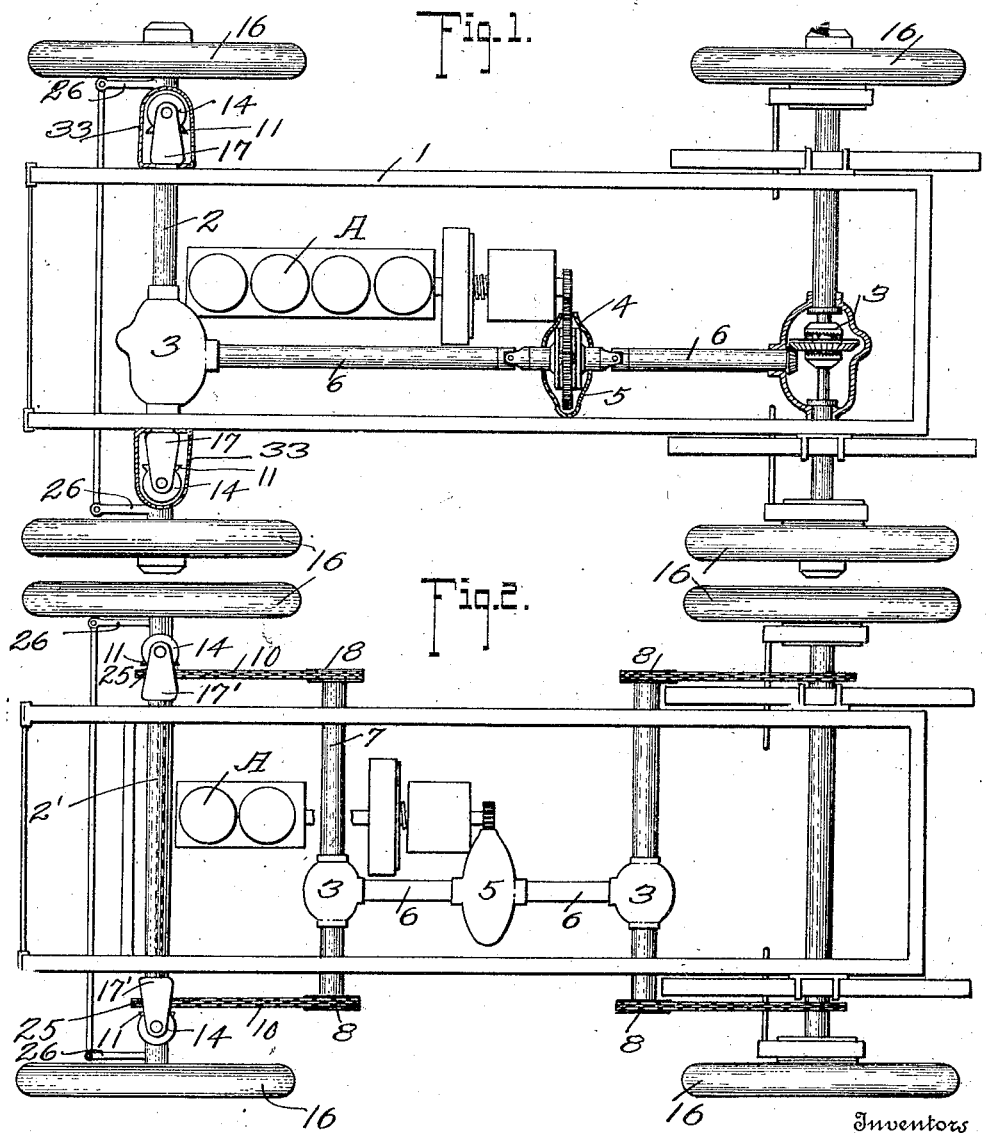

UNITED STATES PATENT OFFICE.

SEABURY E. BRUNER AND HARLEY F. HARDIN, OF MARION, INDIANA.

FOUR-WHEEL DRIVE.

1,077,794.   Specification of Letters Patent.   Patented Nov. 4, 1913.

Application filed April 15, 1912. Serial No. 691,054.

*To all whom it may concern:*

Be it known that we, SEABURY E. BRUNER and HARLEY F. HARDIN, citizens of the United States, residing at Marion, in the county of Grant and State of Indiana, have invented certain new and useful Improvements in Four-Wheel Drives, of which the following is a specification.

This invention appertains to automobiles or similar motor vehicles and involves certain novel improvements in what are known as four-wheel drive mechanisms for such vehicles.

An especial object of the invention is to simplify the driving mechanism which operatively connects the engine shaft with the four wheels of the vehicle and to secure the customary advantages incidental to obtaining a more equal distribution of the strain on the driving wheels, whereby the wear and tear on the tires are reduced, an increase of traction being also derived, promoting efficiency of the machine and facilitating locomotion on muddy, sandy or gravel roads.

Still other features of the invention reside in the peculiar relative arrangement of the gear elements of the driving mechanisms for the front wheels of the vehicle, the employment of a peculiar sectional bearing for the stub or steering shafts of the front wheels, and the provision of a special form of front axle which reinforces the stub axles and affords to a certain extent a peculiarly advantageous thrust bearing.

For a full understanding of the present invention, reference is to be had to the following description and to the accompanying drawings, in which—

Figure 1 is a top plan view of a motor vehicle, with the top removed to show the chassis, the motor unit, and the driving connections between the latter and the wheels. Fig. 2 is a similar view of a motor vehicle of the chain drive type having the present invention applied thereto. Figs. 3 and 4 are an elevation and sectional view, respectively, bringing out more clearly the modified adaptation of the invention especially useful on machines of the chain drive type. Fig. 5 is a detail view of one of the sections of the bearing for each front wheel drive shaft. Fig. 6 is a fragmentary perspective view of the housing for inclosing the transmission gears on the front axle, illustrating the bearing sleeve and slot in which the latter operates. Fig. 7 is a detail sectional view of the housing partly broken away and showing more clearly the coöperation of the closure member with the slot through which the bearing sleeve passes. Fig. 8 is a fragmentary elevation of the front axle employed in Fig. 1, part of the casing surrounding the axle being in section.

Throughout the following detail description and on the several figures of the drawings, similar parts are referred to by like reference characters.

As shown most clearly in the drawings, the chassis 1 of the motor vehicle is of the common type and the usual divided driving axle 2 is located at the rear end of the machine, the parts of said axle being connected by an ordinary differential 3. The engine or motor A is preferably disposed between the front and rear axles and is geared or otherwise operatively connected to the differential gear 4 which is supported in any suitable manner and inclosed by the housing 5. The differential 4 is connected to the differential 3 by the flexible shafts 6. As shown in Fig. 2, the shaft A is similarly connected to the transversely disposed shafts 7, the latter comprising sections connected by differential gears and carrying on their outer terminals the sprockets 8 which are operatively connected to the sprockets 25 carried on the wheel axle by the sprocket chains 10.

In Fig. 8 is shown a fragmentary portion of the axle employed in Fig. 1, the same carrying a gear 11 having a concave exterior face adapted to receive the convex interior face 12 of the bevel gear 13, said gears 11 and 13 being operatively connected by the bevel gears 14 and 15 which are rigidly or otherwise connected and mounted on the arm 19 of the upper section of the bearing sleeve 20. The arm 19 is provided with a shoulder 19' by which the gear elements 14 and 15 are supported. The gear 13 is rigidly connected or secured on the inner terminal of the drive shaft 23 by a key 23', as is clearly shown in Fig. 4. The shaft 23 which carries on its outer terminal the wheel 16 is mounted in a bearing sleeve which comprises sections 20 carrying the journal members in coaxial relation, the upper journal member 19 being provided with a shoulder 19', as above described. The sleeve 20, as above premised, is of sectional form, the sections of the sleeve being secured together by bolts or other similar fastenings 24. The casing which surrounds the shaft 2 terminates in a pair of spaced arms or brackets 17 which are provided with suitable bearings in which the journal members are mounted to permit of bodily turning of the sleeve 20 when actuated by the steering arm 26 integrally or otherwise connected with one of the sections of the sleeve.

In Figs. 3 and 4, the mounting of the transmission gear, especially adapted for chain drive types of motor vehicles, is illustrated, though the principles of operation of the drive means for the front wheels are practically the same as above set forth. Those parts shown in Figs. 3 and 4 and employed in the construction in the other figures of the drawings, are numbered similarly to the latter. In using the chain drive type, the dead axle 2' is employed having its terminals provided with the spaced arms 17' and intermediate the spaced arms 17' carries an arm 30 which terminates at its free end proximate to the convex surface of the gear 13, and while normally spaced from said gear, is capable of engaging the same and acting as a thrust bearing therefor when the machine is turning and the journal members 19 are subjected to considerable lateral stress due to the tendency of the machine to skid sidewise. Loosely mounted on his arm or shaft 30 is the gear 11' provided with a concave outer surface in which the convex surface 12 of the gear 13 operates. Integrally formed on, or otherwise secured to the gear 11' is the sprocket 25 which is operatively connected to the sprockets 8, as shown in Fig. 2. It will be obvious that the gear 11 carried by the shaft 2 will also act as a thrust bearing in a manner similar to the arm 30.

A housing 33 is provided to inclose the drive mechanism for each front wheel 8, as shown in Fig. 1, and the bearing sleeve 20 passes through a slot 34 in said housing. On the bearing sleeve will preferably be carried a closure plate 35 to move with the sleeve and normally maintain the slot 34 closed, irrespective of the position occupied by said sleeve. As shown in Fig. 4, the housing 33' incloses all the gear elements of the drive mechanism excepting only the sprocket gear 25 which must necessarily be exposed to permit of its driving connection with the drive chain or belt. By employing this housing hard oil may be carried therein and owing to the closure plate 35, no loss will be incurred.

Having thus described the invention, what is claimed as new is:

1. In a driving mechanism for motor vehicles, the combination of a trifurcated axle, the extreme arms of the trifurcation having bearings, a bearing sleeve in line with the axle and having journals mounted in said bearings, a wheel shaft journaled in said sleeve, a bevel gear journaled on the intermediate arm of the trifurcation and having a concave outer face, a pair of gears journaled on one of the journals of said sleeve, one of the last mentioned gears meshing with the first mentioned gear, and a bevel gear meshing with the other of the second mentioned gears and fixed to the wheel shaft and having a convex face conforming with and extending into the concavity of the first mentioned gear in position for finding a thrust bearing on the terminal of the intermediate arm of the trifurcation, said intermediate arm extending to and bearing against the convexed face of the gear on the wheel shaft, said last mentioned gear being disposed at that side of the axis of the gears journaled on the sleeve bearing at which the first mentioned bevel gear is disposed, whereby driving rotation is delivered from the first mentioned gear to the last mentioned gear in the same direction of rotation.

2. In a driving mechanism for motor vehicles, the combination of an axle provided at one end thereof with a bracket composed of spaced parts having bearings, a bearing sleeve having journal members projecting from opposite sides thereof and mounted in the bearings on the spaced parts of said bracket, a drive shaft mounted in said sleeve, a wheel mounted on one end of the shaft, a driving gear mounted on the shaft, means for transmitting motion to said driving gear, and a bearing arm projecting from the bracket for coöperation with said shaft as a thrust bearing and disposed for transmitting thrust stresses independently of the mesh of the gears.

3. Drive mechanism for motor vehicles, comprising an axle provided with a bracket of somewhat U-form, spaced parts of said bracket having bearings therein, a sleeve composed of sections, each provided with a journal member, and said journal members being mounted in the bearings of the spaced parts of the bracket, a wheel shaft mounted in the sleeve for rotation, a wheel secured to one end of said shaft for rotation therewith, a driving element carried by the other end of the shaft, and means for operating said driving element.

In testimony whereof we affix our signatures in presence of two witnesses.

SEABURY E. BRUNER.
HARLEY F. HARDIN.

Witnesses:
 CORA SAUMENIG,
 THOS. E. PICKERILL.